(12) United States Patent
Nakahara et al.

(10) Patent No.: US 9,695,830 B2
(45) Date of Patent: Jul. 4, 2017

(54) CONTROL DEVICE

(71) Applicant: DAIKIN INDUSTRIES, LTD., Osaka-shi, Osaka (JP)

(72) Inventors: Takayuki Nakahara, Kusatsu (JP); Mizuki Tanaka, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 82 days.

(21) Appl. No.: 14/430,524

(22) PCT Filed: Apr. 30, 2013

(86) PCT No.: PCT/JP2013/062622
§ 371 (c)(1),
(2) Date: Mar. 23, 2015

(87) PCT Pub. No.: WO2014/050195
PCT Pub. Date: Apr. 3, 2014

(65) Prior Publication Data
US 2015/0252814 A1    Sep. 10, 2015

(30) Foreign Application Priority Data

Sep. 26, 2012  (JP) ................................. 2012-212568

(51) Int. Cl.
*G05D 7/00*     (2006.01)
*G05D 11/00*    (2006.01)
(Continued)

(52) U.S. Cl.
CPC .............. *F04D 27/00* (2013.01); *F04B 41/06* (2013.01); *F04B 49/02* (2013.01); *F04B 49/06* (2013.01);
(Continued)

(58) Field of Classification Search
CPC .. F04D 15/0088; F04D 27/00; F04D 15/0066; F04B 49/02; F04B 41/06;
(Continued)

(56) References Cited

U.S. PATENT DOCUMENTS 5,742,500 A * 4/1998 Irvin ................... F04D 15/0066
417/2
6,178,393 B1 * 1/2001 Irvin ................... F04D 15/0066
700/282
(Continued)

FOREIGN PATENT DOCUMENTS

JP    2001-263255 A    9/2001
JP    2006-2594 A      1/2006
(Continued)

OTHER PUBLICATIONS

International Preliminary Report of corresponding PCT Application No. PCT/JP2013/062622 dated Apr. 9, 2015.
(Continued)

*Primary Examiner* — Ziaul Karim
(74) *Attorney, Agent, or Firm* — Global IP Counselors

(57) ABSTRACT

A control device controls a plurality of inverter-driven pumps disposed between a heat source device and an air-conditioner. The control device includes a perceiving unit that perceives a cumulative operation time and a rotation speed distribution during operation of each of the pumps, a degradation degree derivation unit that derives a degradation degree of each of the pumps based on the cumulative operation time and the rotation speed distribution during operation of each of the pumps, and a determining unit that determines the pump to be next operated/stopped based on the degradation degree of each of the pumps. The degradation degree derivation unit further derives an increased amount of the degradation degree of each of the pumps in a predetermined period. The deter-
(Continued)

mining unit determines the pump to be next operated/stopped based on the increased amount of the degradation degree of each of the pumps in the predetermined period.

3 Claims, 10 Drawing Sheets

(51) Int. Cl.
 *F04D 27/00* (2006.01)
 *F04B 41/06* (2006.01)
 *F04B 49/02* (2006.01)
 *F04B 49/06* (2006.01)
 *F24F 11/00* (2006.01)
 *F04D 15/00* (2006.01)
 *G05B 15/02* (2006.01)

(52) U.S. Cl.
 CPC ..... *F04D 15/0066* (2013.01); *F04D 15/0088* (2013.01); *F24F 11/008* (2013.01); *G05B 15/02* (2013.01); *F04B 2203/0214* (2013.01); *F24F 2011/0083* (2013.01)

(58) Field of Classification Search
 CPC . F04B 2203/0214; F04B 49/06; F24F 11/008; F24F 2011/0083

USPC .................................................... 700/282
 See application file for complete search history.

(56) References Cited

U.S. PATENT DOCUMENTS

| 2003/0133808 A1* | 7/2003 | Sabini ................. F04D 15/0088 417/53 |
| 2011/0225998 A1* | 9/2011 | Yamashita ............. F24F 3/065 62/126 |
| 2012/0031605 A1* | 2/2012 | Takayama ............. F24F 11/008 165/201 |

FOREIGN PATENT DOCUMENTS

| JP | 2009-133253 A | 6/2009 |
| JP | 2012-154544 A | 8/2012 |

OTHER PUBLICATIONS

International Search Report of corresponding PCT Application No. PCT/JP2013/062622 dated Jun. 25, 2013.
European Search Report of corresponding EP Application No. 13 84 2421.3 dated Jun. 15, 2016.

* cited by examiner

| ROTATION SPEED ALLOCATION RULE | |
|---|---|
| $\alpha \leq A < \beta$ | LOW-SPEED ROTATION REGION |
| $\beta \leq A < \gamma$ | MEDIUM-SPEED ROTATION REGION |
| $\gamma \leq A < \Delta$ | HIGH-SPEED ROTATION REGION |

FIG. 4

| PUMP | CUMULATIVE OPERATION TIME | REFERENCE VALUE | GENERALIZED VALUE |
|---|---|---|---|
| FIRST | 400 | 1500 | 0.26 |
| SECOND | 600 | | 0.40 |
| THIRD | 1000 | | 0.66 |
| FOURTH | 1200 | | 0.80 |
| FIFTH | 1300 | | 0.86 |

FIG. 5

| PUMP | NUMBER OF START/STOP CYCLE | REFERENCE VALUE | GENERALIZED VALUE |
|---|---|---|---|
| FIRST | 900 | 1000 | 0.90 |
| SECOND | 700 | | 0.70 |
| THIRD | 500 | | 0.50 |
| FOURTH | 800 | | 0.80 |
| FIFTH | 200 | | 0.20 |

FIG. 6

| PUMP | TOTAL CUMULATIVE OPERATION TIME | REFERENCE VALUE | GENERALIZED VALUE |
|---|---|---|---|
| FIRST | 100 | 1000 | 0.10 |
| SECOND | 50 | | 0.05 |
| THIRD | 50 | | 0.05 |
| FOURTH | 200 | | 0.20 |
| FIFTH | 300 | | 0.30 |

FIG. 7

| PUMP | DEGRADATION DEGREE |
|---|---|
| FIRST | 50 |
| SECOND | 50 |
| THIRD | 50 |
| FOURTH | 0 |
| FIFTH | 0 |
| SIXTH | 0 |

FIG. 10

CONTROL DEVICE

CROSS-REFERENCE TO RELATED APPLICATIONS

This U.S. National stage application claims priority under 35 U.S.C. §119(a) to Japanese Patent Application No. 2012-212568, filed in Japan on Sep. 26, 2012, the entire contents of which are hereby incorporated herein by reference.

TECHNICAL FIELD

The present invention relates to a control device.

BACKGROUND ART

Conventionally, there are control devices that perform control of the number of pumps in reference to a predetermined parameter as a pump degradation factor. For example, in Japanese Patent Unexamined Publication 2009-133253, the time of operation of each of the pumps is set in advance, and operation/stop of a plurality of pumps are determined according to whether or not the cumulative pump operation time reaches the set time of operation. The cumulative operation times of the respective pumps are thereby equalized.

SUMMARY

Technical Problem

In the control disclosed in Japanese Patent Unexamined Publication 2009-133253, the cumulative pump operation time is referred to as the pump degradation factor. However, since the pump degradation degree is not limited only to the cumulative pump operation time, the pump degradation degree is thought to be necessarily grasped more in line with the actual operation status.

Therefore, the object of the present invention is to provide a control device capable of further equalizing the degradation degrees of pumps.

Solution to Problem

A control device according to a first aspect of the present invention is a control device controlling a plurality of inverter-driven pumps disposed between a heat source device and an air conditioner and is provided with a perceiving unit, a degradation degree derivation unit, and a determining unit. The perceiving unit perceives a cumulative operation time of each of the pumps and a rotation speed distribution during operation of each of the pumps. The degradation degree derivation unit derives the degradation degree of each of the pumps on the basis of the cumulative operation time of each of the pumps and the rotation speed distribution during operation of each of the pumps. The determining unit determines the pump to be next operated/stopped on the basis of the degradation degree of each of the pumps.

The cumulative operation time is conventionally used as a parameter when calculating the degradation degree of a pump, but the cumulative operation time is not the only factor affecting the degradation degree of a pump. In addition, some pump operation rotation speeds are thought to have a large effect on the pump.

Accordingly, in the present invention, the degradation degrees of a plurality of pumps are derived based on not only the cumulative operation times but also the distributions of rotation speed during operation of the pumps, and pumps to be next operated/stopped are determined in the plurality of pumps on the basis of the derived degradation degrees of the pumps. The operation of a plurality of pumps thereby can be controlled more in line with the actual operation status of the pumps. Therefore, it is possible to further equalize the degradation degrees of a plurality of pumps.

A control device according to a second aspect of the present invention is the control device according to the first aspect of the present invention and is further provided with a calculation unit. The calculation unit calculates an operation time of each of the pumps in a low-speed rotation region and an operation time of each of the pumps in a high-speed rotation region on the basis of the rotation speed distribution during operation of each of the pumps. The degradation degree derivation unit derives the degradation degree of each of the pumps on the basis of the cumulative operation time of each of the pumps, the operation time of each of the pumps in the low-speed rotation region and the operation time of each of the pumps in the high-speed rotation region.

Operation in the high-speed rotation region is thought to have a larger effect on service life of the grease because of heat, and operation in the low-speed rotation region is thought to increase the likelihood of malfunction because of increased vibration. In other words, operation of the pump in the low-speed and high-speed rotation regions is thought to have a larger effect on the degradation degree.

Accordingly, in the present invention, the operation times of each of the pumps in the high-speed rotation region and the low-speed rotation region are used as parameters to derive the degradation degree of each of the pumps, whereby the degradation degree of each of the pumps can be derived more in line with the actual operation. It is noted that the operation times of each of the pumps in the high-speed rotation region and the low-speed rotation region herein also include the total operation time in the high-speed rotation region and the low-speed rotation region.

A control device according to a third aspect of the present invention is the control device according to the second aspect of the present invention, wherein the perceiving unit further perceives a number of start/stop cycle of each of the pumps. The degradation degree derivation unit derives the degradation degree of each of the pumps further on the basis of the number of start/stop cycle of each of the pumps.

In the present invention, it is possible to derive the degradation degree of each of the pumps more in line with the actual operation by further referencing the number of start/stop cycle of each of the pumps as a parameter to derive the degradation degree of each of the pumps.

A control device according to a fourth aspect of the present invention is the control device according to the third aspect of the present invention and is further provided with a storage unit. The storage unit stores weighting values respectively corresponding to the cumulative operation time of the pumps, the operation time of the pumps in the low-speed rotation region and the operation time of the pumps in the high-speed rotation region, and the number of start/stop cycle of the pumps. The degradation degree derivation unit derives the degradation degree of each of the pumps further on the basis of the weighting values respectively corresponding to the cumulative operation time of the pumps, the operation time of the pumps in the low-speed rotation region and the operation time of the pumps in the high-speed rotation region, and the number of start/stop cycle of the pumps.

The effects on the pumps respectively by the cumulative operation time, the operation rotation speed distribution (the operation in the low-speed rotation region and the operation in the high-speed rotation region), and the number of start/stop cycle are thought to be ununiform.

Accordingly, in the present invention, weighting values respectively for these parameters are stored in the storage unit in advance. It is thereby possible to determine a degradation degree that is more in line with the actual operation.

A control device according to a fifth aspect of the present invention is the control device according to the fourth aspect of the present invention, wherein the degradation degree derivation unit further derives an increased amount of the degradation degree of each of the pumps in a predetermined period. The determining unit determines the pump to be next operated/stopped on the basis of the increased amount of the degradation degree of each of the pumps in the predetermined period.

The predetermined period corresponds to, for example, a period between pump installation (replacement) and next scheduled pump replacement.

In the present invention, in a case where, for example, a half of a plurality of pumps are replaced every prescribed years, it is possible to avoid a situation in which only the newly replaced pumps are operated since the pumps to be next operated/stopped are determined on the basis of increased amount of the degradation degree of each of the pumps in the predetermined period.

Advantageous Effects of Invention

The control device according to the first aspect of the present invention makes it possible to further equalize the degradation degrees of the pumps.

The control device according to the second aspect of the present invention makes it possible to derive the degradation degrees of the pumps more in line with the actual operation.

The control device according to the third aspect of the present invention makes it possible to derive the degradation degrees of the pumps more in line with the actual operation.

The control device according to the fourth aspect of the present invention makes it possible to determine the degradation degrees that are more in line with the actual operation.

The control device according to the fifth aspect of the present invention makes it possible to avoid a situation in which only the newly replaced pumps are operated in a case where, for example, a half of a plurality of pumps are replaced every prescribed years.

BRIEF DESCRIPTION OF THE DRAWINGS

FIG. 4 is a table showing an example of a rotation speed allocation rule;

FIG. 5 is a table showing cumulative operation times and generalized values of the first through fifth inverter pumps;

FIG. 6 is a table showing numbers of start/stop cycle and generalized values of the first through fifth inverter pumps;

FIG. 7 is a table showing total cumulative operation times in low-speed and high-speed rotation regions and generalized values of the first through fifth inverter pumps;

FIG. 10 is a table showing degradation degrees of the respective inverter pumps at the time when predetermined inverter pumps are replaced according to modification example B.

DESCRIPTION OF EMBODIMENTS

An air-conditioning system 100 provided with a control device 110 according to the present invention will now be described with reference to the accompanying drawings.

(1) Overall Configuration of Air-Conditioning System

Figure 1:
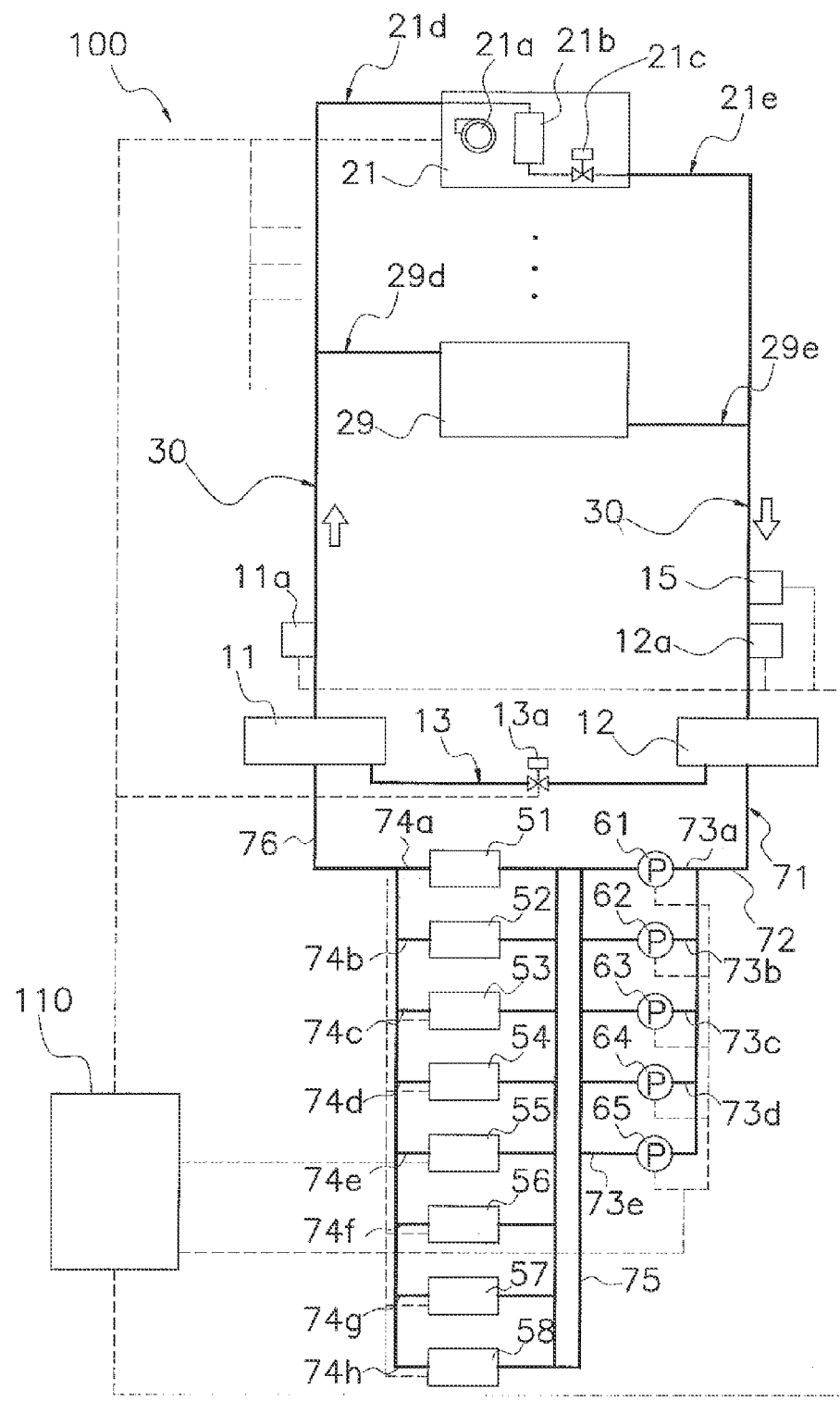
FIG. 1 is a schematic configuration diagram of an air-conditioning system provided with a control device according to an embodiment of the present invention.

FIG. 1 is a schematic configuration diagram of the air-conditioning system 100 provided with the control device 110 according to an embodiment of the present invention. The air-conditioning system 100 is primarily installed in a relatively large structure such as a building, a factory, a hospital, or a hotel.

As shown in FIG. 1, the air-conditioning system 100 mainly comprises a plurality (eight in the present embodiment) of first to eighth refrigerators 51-58 as heat source devices, first through ninth air conditioners 21-29 as heat-utilizing devices installed in individual spaces to be air-conditioned (e.g., indoor spaces) in the structure, a plurality (five in the present embodiment) of first through fifth inverter pumps 61-65 disposed between the first to eighth refrigerators 51-58 and the first through ninth air conditioners 21-29, and an air-conditioning system controller 110 as a control device to control the above devices.

In the air-conditioning system 100, water, as a heat medium, circulates between the devices through a water pipeline 30. In the water pipeline 30, cold water (during a cooling operation) or hot water (during a heating operation) flows from the first through eighth refrigerators 51-58 to the first through ninth air conditioners 21-29, and cold heat or warm heat of the water is used in air-conditioning operation at the first through ninth air conditioners 21-29.

A description will now be given for the devices which mainly the air-conditioning system 100 has, and a description will then be given for the configuration and the process flow of the air-conditioning system controller 110.

(2) Devices Configuring Air-Conditioning System (2-1) First Through Eighth Refrigerators As shown in FIG. 1, the first through eighth refrigerators 51-58 are connected in parallel to each other, and are adapted to take in water from a return header 12 and feed water to a feed header 11. The return header 12 and the feed header 11 are connected by pipeline 71. The pipeline 71 includes a return header connection pipeline 72 connected to the return header 12, first through fifth pump pipelines 73*a*-73*e* which plurally branch from the return header connection pipeline 72 and in which the first through fifth inverter pumps 61-65 are respectively disposed, first through eighth refrigerator pipelines 74*a*-74*h* in which the first through eighth refrigerators 51-58 are respectively disposed, an intermediate pipeline 75 which connects the first through fifth pump pipelines 73a-73e and the first through eighth refrigerator pipelines 74a-74h, and a feed header connection pipeline 76 which connects the first through eighth refrigerator pipelines 74a-74h and the feed header 11.

Each of the first through eighth refrigerators 51-58 is an air-cooling heat pump chiller and configures a refrigeration circuit by sequentially connecting a compressor, an air-side heat exchanger, an expansion valve, and a water-side heat exchanger. The interior of the refrigeration circuit is filled with a refrigerant.

(2-2) First Through Firth Inverter Pumps

The first through fifth inverter pumps 61-65 are inverter-driven pumps that are inverter-driven by the air-conditioning system controller 110. The first through fifth inverter pumps 61-65 feed water as a heat medium, which is discharged from the first through ninth air conditioners 21-29, to the first through eighth refrigerators 51-58 through the water pipeline 30 and the return header 12 and thereby cause the water to circulate. Accordingly, water (cold water or hot water) fed out from the first through eighth refrigerators 51-58 flows to the water pipeline 30 through the feed header 11, and water returning from the first through ninth air conditioners 21-29 through the water pipeline 30 flows into the return header 12 and then is sucked into the first through eighth refrigerators 51-58.

(2-3) First Through Ninth Air-Conditioner

Each of the first through ninth air conditioners 21-29 processes the heat load of the space to be air-conditioned by with the cold heat of the cold water or the warm heat of the hot water generated by the first through eighth refrigerators 51-58 as heat source devices. In other words, the first through ninth air conditioners 21-29 perform air-conditioning (i.e., a cooling operation or a heating operation) in the space to be air-conditioned by using the cold water or the hot water flowing from the first through eighth refrigerators 51-58.

The first through ninth air conditioners 21-29 are respectively installed in the same or different spaces to be air-conditioned. The first through ninth air conditioners 21-29 are respectively disposed in parallel between the water pipeline 30 extending from the feed header 11 and the water pipeline 30 connected to the return header 12. The first through ninth air conditioners 21-29 take in water from the water pipeline 30 on the feed header 11 side through intake pipelines 21d-29d and return the water to the water pipeline 30 on the return header 12 side through return pipelines 21e-29e.

An air channel to flow air is formed inside the casing of each of the first through ninth air conditioners 21-29. One end of an intake duct (not shown) is connected to an inflow end of the air channel, and one end of an air supply duct (not shown) is connected to an outflow end of the air channel. The other end of the intake duct and the other end of the air supply duct are respectively connected to the space to be air-conditioned.

A blower fan 21a, a heat exchanger 21b, a flow rate control valve 21c, and other elements are provided in each of the casings of the first through ninth air conditioners 21-29. The heat exchanger 21b exchanges heat between water and air and thereby cools or heats the air. Specifically, the heat exchanger 21b is a fin-and-tube heat exchanger having a plurality of heat transfer fins and heat transfer tubes penetrating the heat transfer fins. The water circulating between the first through eighth refrigerators 51-58 and the first through ninth air conditioners 21-29 flow in the heat transfer tubes of the heat exchanger 21b, and the heat of the water is supplied to the air through the heat transfer tubes and the heat transfer fins, whereby the air is cooled or heated. The rotation speed of the blower fan 21a can be varied in stages by using inverter control, and the amount of airflow of the heated or cooled air can be adjusted. The flow rate control valve 21c has a role of adjusting the amount of water flowing in the air-conditioner. In other words, the flow rate of the water flowing in each of the first through ninth air conditioners 21-29 is determined by the opening degree of each of the flow rate control valves 21c.

(2-4) Other Configurations

The feed header 11 and the return header 12 are connected by a bypass pipeline 13. A bypass flow rate adjustment valve 13a is disposed on the bypass pipeline 13. The bypass flow rate adjustment valve 13a adjusts the flow rate of the water flowing to the first through ninth air conditioners 21-29. In case when the amount of water required on the side of the first through ninth air conditioners 21-29 is greater than the flow rate of the water flowing through the first through eighth refrigerators 51-58, the water feed pressure of the feed header 11 will increase even if the amount of water required on the side of the first through ninth air conditioners 21-29 is decreased and the inverter frequency of the first through fifth inverter pumps 61-65 in operation is at a lower limit. In such an instance, it is possible to suppress the flow rate of water flowing to the first through ninth air conditioners 21-29 by varying the opening degree of the bypass flow rate adjustment valve 13a and thereby adjusting the flow rate of water directly returning from the feed header 11 to the return header 12 through the bypass pipeline 13.

A supply water temperature sensor 11a to measure water temperature is provided on the downstream side of the feed header 11 of the water pipeline 30. A return water temperature sensor 12a to measure water temperature and a water amount sensor 15 to measure the water amount are provided on the upstream side of the return header 12 of the water pipeline 30.

(3) Action of Air-Conditioning System (3-1) Overview of Overall Action

In each of the first through ninth air conditioners 21-29, air taken in by the intake duct (not shown) from the space to be air-conditioned flows through the air channel in the casing. This air is cooled/heated in each of the heat exchangers 21b and other elements by cold water/hot water flowing from the first through eighth refrigerators 51-58. The cooled/heated air is supplied to the space to be air-conditioned through the air supply duct (not shown), whereby the space to be air-conditioned is cooled/heated.

(3-2) Pump Control by Air-Conditioning System

The air-conditioning system controller 110 performs control of the number of pumps, in which the number of operating pumps among the first through fifth inverter pumps 61-65 is varied according to the heat load of the first through ninth air conditioners 21-29 (specifically, the heat load of the space to be air-conditioned which is to be processed by the first through ninth air conditioners 21-29). Specifically, for example, if the heat load of the first through ninth air conditioners 21-29 is small, a single inverter pump is operated, and if the heat load of the first through ninth air conditioners 21-29 is large, a plurality of inverter pumps are operated.

In order to inhibit the unevenness of the degradation degree of the pumps which is occurred by only a part of the plurality of the inverter pumps being operated repeatedly, the air-conditioning system controller 110 determines the next pump to be operated/stopped on the basis of the degradation degree of the first through fifth inverter pumps 61-65 when the control of the number of pump is performed. This will be described below in the description regarding the configuration and the process flow of the air-conditioning system controller 110.

(3-3) Configuration of Air-Conditioning System Controller

Figure 2:
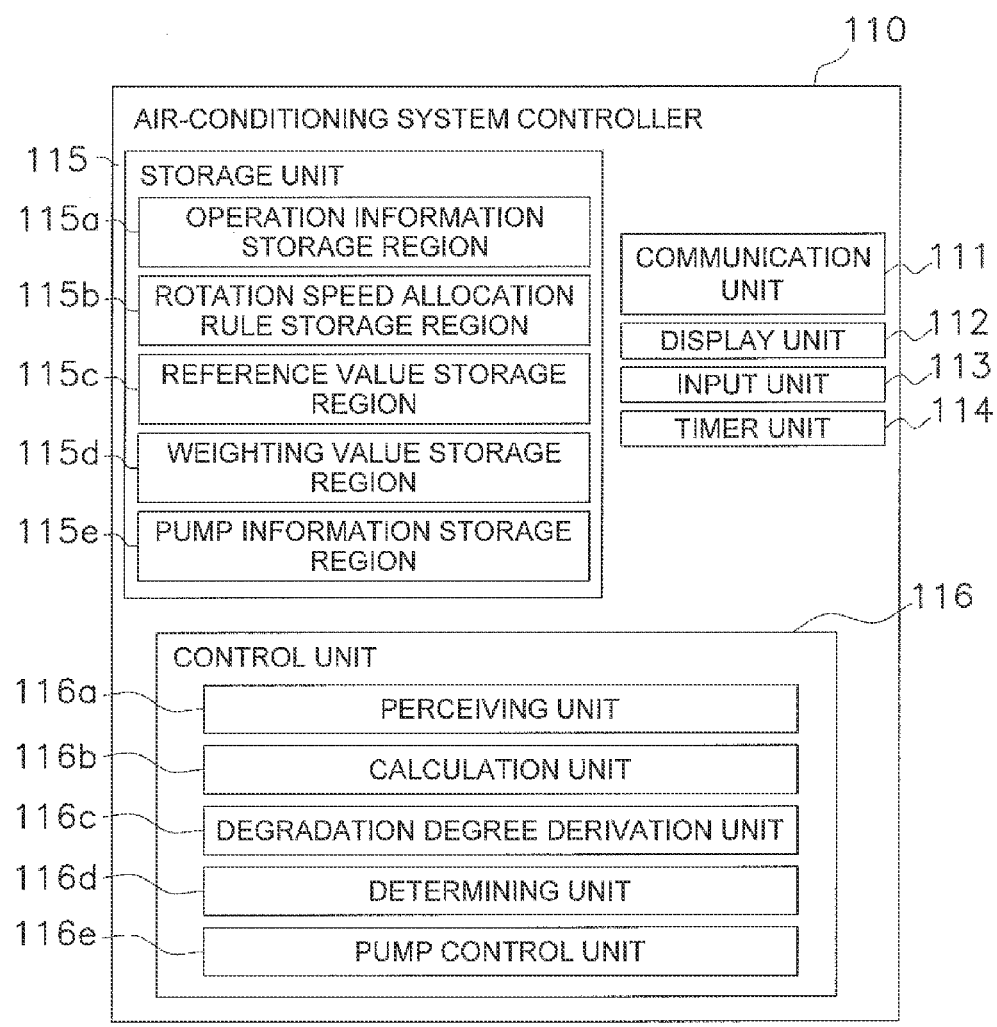
FIG. 2 is a schematic configuration diagram of an air-conditioning system controller.

FIG. 2 is a schematic configuration diagram of the air-conditioning system controller 110. As shown in FIG. 1, the air-conditioning system controller 110 is connected to the supply water temperature sensor 11a, the return water temperature sensor 12a, the water amount sensor 15, the first through ninth air conditioners 21-29, the first through eighth refrigerators 51-58, the first through fifth inverter pumps 61-65, the bypass flow rate adjustment valve 13a, and other elements. As shown in FIG. 2, the air-conditioning system controller 110 primarily has a communication unit 111, a display unit 112, an input unit 113, a timer unit 114, a storage unit 115, and a control unit 116.

(3-3-1) Communication Unit

The communication unit 111 is a network interface to enable communication between the air-conditioning system controller 110 and a variety of devices, sensors, and other elements.

(3-3-2) Display Unit

The display unit 112 is primarily configured from a display. A screen image indicating information such as the operation status of the first through ninth air conditioners 21-29 is displayed on the display unit 112. The operation status of the first through ninth air conditioners 21-29 includes information such as the operation/stop states and the operation mode (cooling mode/heating mode). Other information displayed on the display unit 112 includes the average value of the water temperature measured using the supply water temperature sensor 11a and the return water temperature sensor 12a, the setting temperature for the water, and the water amount measured by the water amount sensor 15.

(3-3-3) Input Unit

The input unit 113 is primarily configured from operation buttons and a touch panel covering the display. When an operator or another user touches the operation button or a button on the touch panel, a control process corresponding to the button is executed by the control unit 116.

(3-3-4) Timer Unit

The timer unit 114 measures time elements such as the time, date, month, year, day of the week, and the length of elapsed time from a predetermined reference time.

(3-3-5) Storage Unit

The storage unit 115 is configured from a hard disc or a similar element and has an operation information storage region 115a, a rotation speed allocation rule storage region 115b, a reference value storage region 115c, a weighting value storage region 115d, and a pump information storage region 115e.

(3-3-5-1) Operation Information Storage Region

The operation information storage region 115a stores the operation status for elements such as the first through ninth air conditioners 21-29, the first through eighth refrigerators 51-58, and the first through fifth inverter pumps 61-65 perceived by an perceiving unit 116a described further below. The operation status for the first through ninth air conditioners 21-29 include the operation/stop states, the operation mode (cooling mode/heating mode, etc.), the amount of airflow produced by the blower fan 21a, the temperature and the pressure of water flowing through the heat exchanger 21b, the opening degree of the flow rate control valve 21c, the cumulative operation time, and the number of start/stop cycle. With regards to the temperature and pressure of the water and the temperature and pressure of the refrigerant, information from sensors measuring these variables is received by the air-conditioning system controller 110 (more specifically, the perceiving unit 116a described further below) directly or via the control units (not shown) of the first through ninth air conditioners 21-29. The operation status of the first through eighth refrigerators 51-58 includes the rotation speed of the compressor, the opening degree of the expansion valve, the refrigerant temperature and pressure at a predetermined position on the refrigeration circuit, the cumulative operation time, the number of start/stop cycle, and the operation/stop states. The operation status of the first through fifth inverter pumps 61-65 includes the rotation speed distribution, the cumulative operation time, the number of start/stop cycle, and the operation/stop states. Other information such as the water temperature measured by the supply water temperature sensor 11a and the return water temperature sensor 12a, the setting temperature for the water, the water amount measured by the water amount sensor 15, and the opening degree of the bypass flow rate adjustment valve 13a is perceived by the perceiving unit 116a and stored in this operation information storage region 115a.

Figure 3:
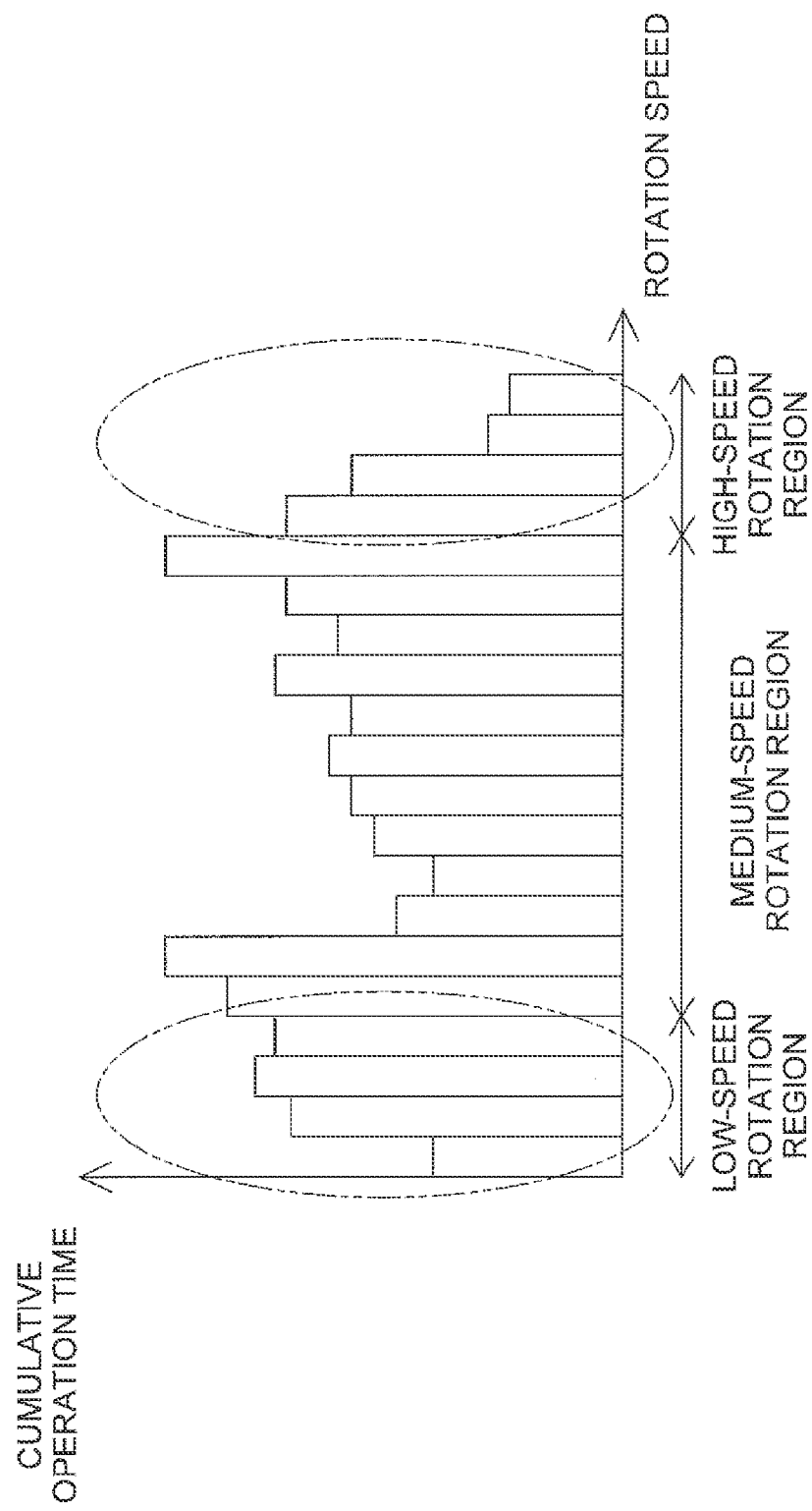
FIG. 3 is a graph showing an example of the rotation speed distribution of an inverter pump.

The rotation speed distribution of the first through fifth inverter pumps 61-65 indicates the relationship between a predetermined rotation speed and the operation time (more specifically, the cumulative operation time) at that predetermined rotation speed, as shown in FIG. 3. FIG. 3 shows an example of the rotation speed distribution of the first through fifth inverter pumps 61-65. The low-speed rotation region, the medium-speed rotation region, and the high-speed rotation region in FIG. 3 will be described below in the section for the rotation speed allocation rule storage region.

(3-3-5-2) Rotation Speed Allocation Rule Storage Region

The rotation speed allocation rule storage region 115b stores a table regarding a rotation speed allocation rule. The rotation speed allocation rule is a rule for allocating the rotation speed into, for example, three-staged rotation regions as shown in FIG. 4. In a case in which a rotation speed allocation rule shown in FIG. 4 is stored in the rotation speed allocation rule storage region 115b, a rotation speed A of the inverter pump equal to or higher than $\alpha$ and less than $\beta$ is allocated to the low-speed rotation region, a rotation speed A equal to or higher than $\beta$ and less than $\gamma$ is allocated to the medium-speed rotation region, and a rotation speed A equal to or higher than $\gamma$ and less than $\Delta$ is allocated to the high-speed rotation region.

(3-3-5-3) Reference Value Storage Region

The reference value storage region 115c stores reference values respectively to generalize the cumulative operation time, the number of start/stop cycle, and the rotation distribution (more specifically, the total cumulative operation time in the low-speed and high-speed rotation regions described further below) of the first through fifth inverter pumps 61-65. Each of the reference values is obtained by simulation, desk-top calculation, or other means, and is inputted in advance by a service personnel or another user through the input unit 113. More specifically, as a reference value relating to the cumulative operation time, an allowable cumulative operation time is inputted. The allowable cumulative operation time is, for example, 1500 hours. As a reference value relating to the number of start/stop cycle, an allowable number of start/stop cycles is inputted. The allowable number of start/stop cycles is, for example, 1000 times. As a reference value relating to the rotation speed distribution (more specifically, the total cumulative operation time in the low-speed and high-speed rotation regions), an allowable cumulative operation time (more specifically, an allowable total cumulative operation time in the low-speed and high-speed rotation regions) is inputted. The allowable total cumulative operation time is, for example, 1000 hours.

(3-3-5-4) Weighting Value Storage Region

The weighting value storage region 115d stores weighting values corresponding to each of the cumulative operation time, the number of start/stop cycle, and the rotation speed distribution (more specifically, the total cumulative operation time in the low-speed and high-speed rotation regions) of the first through fifth inverter pumps 61-65. Each of the weighting values is obtained by simulation, desk-top calculation, or another means, and is inputted in advance by a service personnel or another user through the input unit 113. The weighting value is obtained using the following method. First, a simulation is performed to obtain the length of time until a fault occurs in a case in which operation is maintained without start/stop and the length of time until a fault occurs in a case in which operation is maintained while performing start/stop cycles, whereby a ratio between the weighting value for the cumulative operation time and the weighting value for the number of start/stop cycle is derived. Next, a simulation is performed to obtain the length of time until a fault occurs in a case in which operation is maintained in the high-speed rotation region or the low-speed rotation region and the length of time until a fault occurs in a case in which operation is maintained in the normal rotation region (medium-speed rotation region), and a ratio between the weighting value for the cumulative operation time and the weighting value for rotation speed distribution (i.e., the total cumulative operation time in the low-speed and high-speed rotation regions) is thereby derived. Then, the weighting values for the cumulative operation time, the number of start/stop cycle, and the rotation speed distribution are determined from the ratio between the weighting value for the cumulative operation time and the weighting value for the number of start/stop cycle and the ratio between the weighting value for the cumulative operation time and the weighting value for the rotation speed distribution (i.e., the total cumulative operation time in the low-speed and high-speed rotation regions).

(3-3-5-5) Pump Information Storage Region

The pump information storage region 115e stores the degradation degree of each of the first through fifth inverter pumps 61-65 derived by a degradation degree derivation unit 116c described further below and the priority sequences for the inverter pumps to be next operated/stopped determined by a determining unit 116d.

(3-3-6) Control Unit

The control unit 116 reads programs stored in the storage unit 115 and thereby functions as a perceiving unit 116a, a calculation unit 116b, a degradation degree derivation unit 116c, a determining unit 116d, a pump control unit 116e, and other elements.

(3-3-6-1) Perceiving Unit

The perceiving unit 116a perceives information such as the operation status of the abovementioned devices (such as the first through ninth air conditioners 21-29, the first through eighth refrigerators 51-58, and the first through fifth inverter pumps 61-65) and the measurement values from a variety of sensors. The perceiving unit 116a does not merely perceive the operation statuses of the devices and the measurement values from the sensors (e.g., merely perceive information such as state values measured by sensors), but also perceives the numbers of start/stop cycles and the cumulative operation times by calculating them on the basis of the operation statuses of the devices.

The perceiving unit 116a also perceives the rotation speed distribution during operation of the first through fifth inverter pumps 61-65, i.e., the cumulative operation time at predetermined rotation speeds, from the rotation speed during operation of the first through fifth inverter pumps 61-65. The perceiving unit 116a stores information such as the perceived operation statuses of the devices in the abovementioned operation information storage region 115a.

(3-3-6-2) Calculation Unit

The calculation unit 116b calculates the operation time of the first through fifth inverter pumps 61-65 in the low-speed rotation region and the operation time of the first through fifth inverter pumps 61-65 in the high-speed rotation region on the basis of the rotation speed distribution during operation of the first through fifth inverter pumps 61-65 perceived by the perceiving unit 116a. Specifically, the calculation unit 116b calculates the cumulative operation time in the low-speed rotation region and the cumulative operation time in the high-speed rotation region from the rotation speed distribution during operation of the first through fifth inverter pumps 61-65 in reference to the rotation speed allocation rule stored in the rotation speed allocation rule storage region 115b.

In the present embodiment, the total cumulative operation time, obtained by summing the cumulative operation time in the low-speed rotation region and the cumulative operation time in the high-speed rotation region, is used as the rotation speed distribution which is a parameter to derive the degradation degree of each of the first through fifth inverter pumps 61-65. Therefore, the calculation unit 116b further calculates the total cumulative operation time by summing the cumulative operation time in the low-speed rotation region and the cumulative operation time in the high-speed rotation region. Although not mentioned further above, the cumulative operation time in the low-speed rotation region, the cumulative operation time in the high-speed rotation region, and the total cumulative operation time, calculated by the calculation unit 116b, are also stored in the operation information storage region 115a.

(3-3-6-3) Degradation Degree Derivation Unit

Every predetermined time period (e.g., every hour), the degradation degree derivation unit 116c derives the degradation degrees of the first through fifth inverter pumps 61-65 on the basis of the cumulative operation time, the number of start/stop cycle, and the rotation speed distribution (i.e., the total cumulative operation time in the low-speed and high-speed rotation regions) of the first through fifth inverter pumps 61-65 perceived by the perceiving unit 116a and calculated by the calculation unit 116b.

More specifically, the degradation degree derivation unit 116c first generalizes the cumulative operation time, the number of start/stop cycle, and the total cumulative operation time in the low-speed rotation region and the high-speed rotation region of the first through fifth inverter pumps 61-65 on the basis of the reference values stored in the reference value storage region 115c. Specifically, the degradation degree derivation unit 116c performs the generalization by dividing the cumulative operation time, the number of start/stop cycle, and the total cumulative operation time of each of the inverter pumps by the reference value relating to each of the variables, on the basis of a rule stored in the predetermined storage region. The degradation degree derivation unit 116c then finally derives the degradation degree of each of the first through fifth inverter pumps 61-65 on the basis of the generalized values and the abovementioned weighting values. There now follows a description of the generalization process and the process to derive the degradation degree.

<Generalization Process>

A specific example of generalization will now be described with reference to FIGS. 5-7. FIG. 5 is a table showing an example of cumulative operation times and generalized values of the first through fifth inverter pumps 61-65. FIG. 6 is a table showing an example of the numbers of start/stop cycles and generalized values of the first through fifth inverter pumps 61-65. FIG. 7 is a table showing an example of the total cumulative operation times in the low-speed and high-speed rotation regions and generalized values of the first through fifth inverter pumps 61-65.

If, as shown in FIG. 5, the cumulative operation time of the first inverter pump 61 perceived by the perceiving unit 116*a* is 400 hours and the reference value relating to the cumulative operation time is 1500 hours, generalization relating to the cumulative operation time of the first inverter pump 61 is performed by dividing 400 hours by 1500 hours. As a result, a generalized value of 0.26 is derived. Generalization is similarly performed for the second through fifth inverter pumps 62-65, whereby the generalized values of 0.40, 0.66, 0.80, and 0.86 are derived (these generalized values are herein deemed to be parameters I). Next, if, as shown in FIG. 6, the number of start/stop cycle of the first inverter pump 61 perceived by the perceiving unit 116*a* is 900 times and the reference value relating to the number of start/stop cycle is 1000 times, generalization relating to the number of start/stop cycle of the first inverter pump 61 is performed by dividing 900 times by 1000 times. As a result, a generalized value of 0.90 is derived. Generalization is similarly performed for the second through fifth inverter pumps 62-65, whereby the generalized values of 0.70, 0.50, 0.80, and 0.20 are derived (these generalized values are herein deemed to be parameters II). Lastly, if the total cumulative operation time in the low-speed and high-speed rotation regions of the first inverter pump 61 calculated by the calculation unit 116*b* is 100 hours and the reference value relating to the total cumulative operation time is 1000 hours, generalization relating to the total cumulative operation time in the low-speed and high-speed rotation regions of the first inverter pump 61 is performed by dividing 100 hours by 1000 hours. As a result, a generalized value of 0.10 is derived. Generalization is similarly performed for the second through fifth inverter pumps 62-65, whereby the generalized values of 0.05, 0.05, 0.20, and 0.30 are derived (these generalized values are herein deemed to be parameters III).

<Derivation of Degradation Degree>

After performing generalization of the cumulative operation time, the number of start/stop cycle, and the total cumulative operation times of the first through fifth inverter pumps 61-65 as described above, the degradation degree derivation unit 116*c* derives the degradation degree of each of the inverter pumps 61-65 on the basis of the generalized values for each of the inverter pumps 61-65 and weighting values stored in the weighting value storage region 115*d* respectively corresponding to the cumulative operation time, the number of start/stop cycle, and the total cumulative operation time. Specifically, if, for example, the weighting value corresponding to the cumulative operation time is 3.0, the weighting value corresponding to the number of start/stop cycle is 2.0, and the weighting value corresponding to the total cumulative operation time is 1.0, the degradation degrees of the inverter pumps are derived by parameter I*3.0+parameter II*2.0+parameter III*1.0. The formula to derive the degradation degree is stored in the predetermined storage region.

Accordingly, in the example shown in FIGS. 5-7, the degradation degree of the first inverter pump 61 is 0.26*3.0+ 0.90*2.0+0.10*1.0=2.68. Similar calculations for the second through fifth inverter pumps 62-65 are performed, and degradation degrees of 2.65, 3.03, 4.2, and 3.28 are obtained respectively.

The degradation degree derivation unit 116*c* then stores the derived degradation degree of each of the inverter pumps 61-65 in the abovementioned pump information storage region 115*e*.

(3-3-6-4) Determining Unit

The determining unit 116*d* determines the inverter pumps to be next operated/stopped on the basis of the latest degradation degree of each of the inverter pumps 61-65 stored in the pump information storage region 115*e*. Specifically, the inverter pump 61-65 for which the degradation degree stored in the pump information storage region 115*e* is the smallest is determined as the inverter pump to be next operated. In addition, the inverter pump 61-65 for which the degradation degree stored in the pump information storage region 115*e* is the largest is determined as the inverter pump to be next stopped.

The determining unit 116*d* determines not only the inverter pumps to be next operated/stopped but also the priority sequences of the inverter pumps to be next operated/ stopped on the basis of the degradation degree of each of the inverter pumps 61-65. Specifically, the priority sequence for the inverter pumps to be next operated is determined in sequence from the inverter pump 61-65 for which the degradation degree stored in the pump information storage region 115*e* is smaller. In addition, the priority sequence for the inverter pump to be next stopped is determined in sequence from the inverter pump 61-65 for which the degradation degree stored in the pump information storage region 115*e* is larger.

In the above example, the degradation degrees of the first through fifth inverter pumps 61-65 are 2.68, 2.65, 3.03, 4.2, and 3.28 respectively. Therefore, the priority sequence for the inverter pump to be next operated is in sequence of the second, first, third, fifth, and fourth inverter pumps. The priority sequence for the inverter pump to be next stopped is in the sequence of the fourth, fifth, third, first, and second inverter pumps.

The determining unit 116*d* then stores the determined priority sequences for the inverter pumps to be next operated/stopped in the above pump information storage region 115*e*.

(3-3-6-5) Pump Control Unit

The pump control unit 116*e* performs actions such as transmission of an operation/stoppage command to each of the inverter pumps 61-65 and makes a variety of determinations described below in relation to the flow of the control process.

(3-4) Flow of Control Process in Air-Conditioning System Controller

Figure 8:
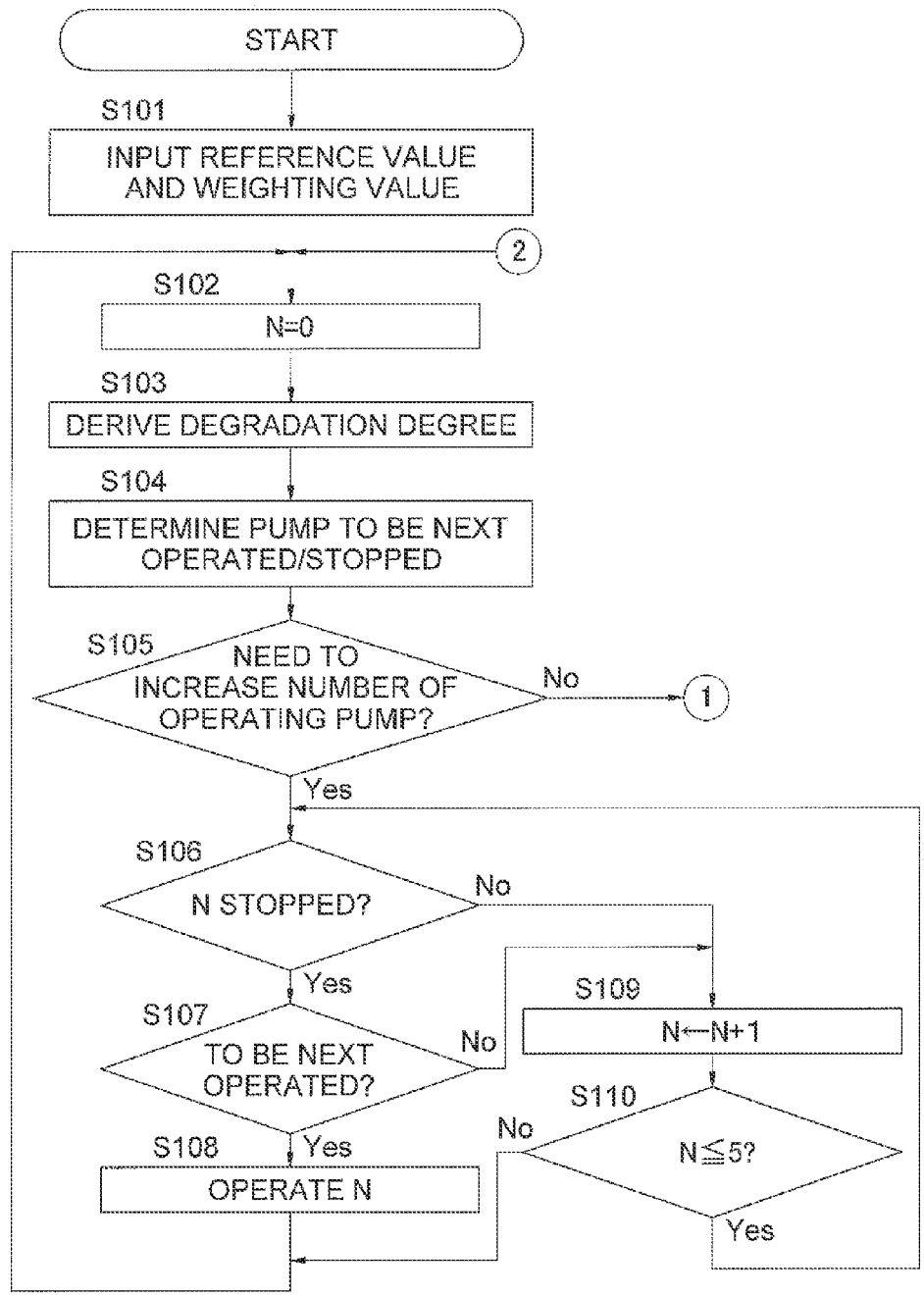
FIG. 8 is a flow chart showing the flow of a control process of the inverter pumps in the air-conditioning system controller.
Figure 9:
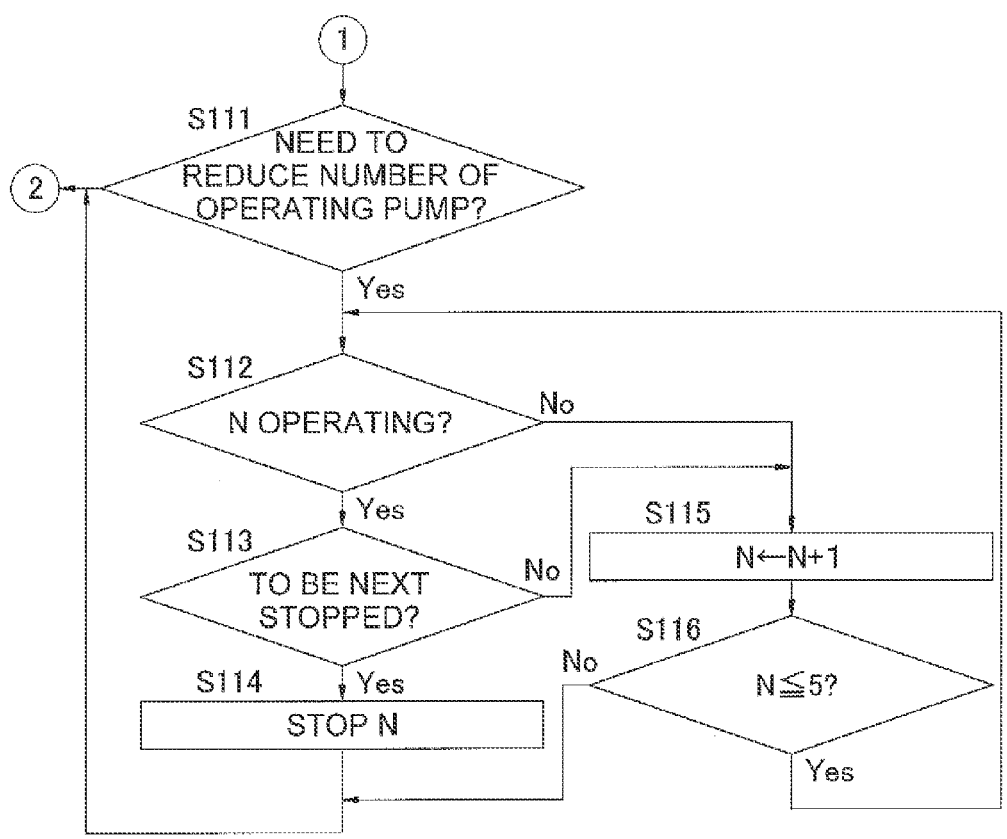
FIG. 9 is a flow chart showing the flow of the control process of the inverter pumps in the air-conditioning system controller (after step S11)

FIGS. 8 and 9 are flow charts showing the flow of a control process of the inverter pumps 61-65 in the air-conditioning system controller 110.

First, as shown in FIG. 8, in step S101, a service personnel or another user inputs the reference values and the weighting values in advance through the input unit 113. The reference values and the weighting values are thereby respectively stored in the reference value storage region 115c and the weighting value storage region 115d.

In step S102, number N of the inverter pump is set to an initial value of zero. The inverter pump indicated by number 1 corresponds to the first inverter pump 61, number 2 corresponds to the second inverter pump 62, number 3 corresponds to the third inverter pump 63, number 4 corresponds to the fourth inverter pump 64, and number 5 corresponds to the fifth inverter pump 65.

In step S103, the degradation degree derivation unit 116c derives the degradation degrees of the first through fifth inverter pumps 61-65 as described above. In step S104, the determining unit 116d determines the inverter pumps to be next operated/stopped on the basis of the degradation degree of each of the inverter pumps 61-65 derived by the degradation degree derivation unit 116c (the latest degradation degree of each of the inverter pumps 61-65 stored in the pump information storage region 115e).

In step S105, the pump control unit 116e determines whether or not there is a need to increase the number of the operating inverter pumps 61-65. Specifically, the pump control unit 116e determines whether or not there is a need to increase the number of the operating inverter pumps 61-65 on the basis of the heat load of the space to be air-conditioned which is to be processed by the first through ninth air conditioners 21-29. If it is determined that there is a need to increase the number of the operating inverter pumps, the flow proceeds to step S106.

In step S106, the pump control unit 116e determines whether or not the inverter pump corresponding to number N is in a stopped state. If it is determined that the inverter pump corresponding to the number N is in the stopped state, in step S107, the pump control unit 116e determines whether or not the inverter pump corresponding to the number N is determined to be the inverter pump to be next operated. More specifically, the pump control unit 116e determines, on the basis of the priority sequences of the inverter pumps to be next operated/stopped determined by the determining unit 16d (i.e., the latest operation/stoppage priority sequences for the inverter pumps 61-65 stored in the pump information storage region 115e), whether or not the inverter pump corresponding to the number N is determined to be the inverter pump to be next operated. On the other hand, if it is determined in step S106 that the inverter pump corresponding to number N is not in the stopped state, the control unit 116e substitutes N+1 for N in step 109. Then, in step S110, the pump control unit 116e determines whether or not N is equal to or smaller than five. In the present embodiment, it is determined whether or not N is five or less because there are five inverter pumps 61-65. However, this number five may be changed as appropriate according to the number of the inverter pumps. If it is determined in step S110 that N is equal to or smaller than 5, the flow returns to step S106.

If the pump control unit 116e determines in step S107 that the inverter pump corresponding to number N is determined to be the inverter pump to be next operated, the flow proceeds to step S108 and the inverter pump corresponding to the number N is operated. In other words, an operation command is transmitted to the pump corresponding to the number N. The flow then returns to step S102 and subsequent processes are repeated. If it is determined in step S110 that N is not equal to or smaller than five, the flow also returns to step S102.

If it is determined in step S105 that there is no need to increase the number of the operating inverter pumps, the flow proceeds to step S111 in FIG. 9. In step S111, the pump control unit 116e determines whether or not there is a need to reduce the number of the operating inverter pumps. Specifically, the pump control unit 116e determines whether or not there is a need to reduce the number of the inverter pumps 61-65 on the basis of the heat load of the space to be air-conditioned which is to be processed by the first through ninth air conditioners 21-29. If it is determined that there is a need to reduce the number of the operating inverter pumps, the flow proceeds to step S112. If, on the other hand, it is determined that there is no need to reduce the number of the operating inverter pumps, the flow returns to step S102 in FIG. 8.

In step S112, the pump control unit 116e determines whether or not the inverter pump corresponding to number N is in an operating state. If it is determined that the inverter pump corresponding to number N is in the operating state, in step S113, the pump control unit 116e determines whether or not the inverter pump corresponding to the number N is determined as the inverter pump to be next stopped. More specifically, the pump control unit 116e determines, on the basis of the priority sequences of the inverter pumps to be next operated/stopped determined by the determining unit 116d (i.e., the latest operation/stoppage priority sequences for the inverter pumps 61-65 stored in the pump information storage region 115e), whether or not the inverter pump corresponding to the number N is determined as the inverter pump to be next stopped. On the other hand, if it is determined in step S112 that the inverter pump corresponding to number N is not in the operating state, the pump control unit 116e substitutes N+1 for N in step S115. Then, in step S116, the pump control unit 116e determines whether or not N is equal to or smaller than five. If it is determined in step S116 that N is equal to or smaller than five, the flow returns to step S112.

(4) Characteristics (4-1)

Conventionally, there are control devices that perform control of the number of pumps in reference to a predetermined parameter as a pump degradation factor. For example, in Patent Literature 1 (Japanese Patent Unexamined Publication 2009-133253), the time of operation of each of the pumps is set in advance, and operation/stop of a plurality of pumps are determined according to whether or not the cumulative pump operation time reaches the set time of operation. The cumulative operation times of the respective pumps are thereby equalized.

In the control disclosed in Patent Literature 1, the cumulative pump operation time is referred to as the pump degradation factor. However, since the pump degradation degree is not limited to the cumulative pump operation time, the pump degradation degree is thought to be necessarily grasped more in line with the actual operation status.

Accordingly, in the present embodiment, the perceiving unit 116a of the air-conditioning system controller 110 perceives not only the cumulative operation time of the inverter pumps 61-65 but also the number of start/stop cycle and the rotation speed distribution during operation. The degradation degree derivation unit 116c derives the degradation degrees of each of the inverter pumps 61-65 on the basis of the above variables, and the determining unit 116d determines the inverter pump to be next operated/stopped on the basis of the degradation degrees.

Thus, in the present embodiment, parameters such as the number of start/stop cycle and the rotation speed distribution during operation are perceived in addition to the cumulative operation time as degradation factors for the inverter pumps

61-65, whereby the control of the number of inverter pumps can be performed more in line with the actual operation status of the inverter pumps 61-65. Accordingly, in the present embodiment, it is possible to further equalize the degradation degrees of the plurality of inverter pumps 61-65.

(4-2)

Furthermore, in the present embodiment, the calculation unit 116b of the air-conditioning system controller 110 calculates the cumulative operation time in the low-speed rotation region and the cumulative operation time in the high-speed rotation region of each of the inverter pumps 61-65 from the rotation speed distribution during operation of each of the inverter pumps 61-65, and further calculates the total cumulative operation time which is the total of the above cumulative operation times.

The degradation degree derivation unit 116c derives the degradation degrees of each of the inverter pumps 61-65 on the basis of the cumulative operation time, the numbers of start/stop cycle, and the total cumulative operation times in the low-speed and high-speed rotation regions of each of the inverter pumps 61-65.

Operation in the high-speed rotation region is thought to have a larger effect on grease because of heat, and operation in the low-speed rotation region is thought to increase the likelihood of malfunction of the device because of increased vibration. In other words, operation of the inverter pumps in the low-speed and high-speed rotation regions has a larger effect on the degradation degree. Accordingly, as shown in the present embodiment, the cumulative operation time in the low-speed and high-speed rotation regions and the total cumulative operation time are calculated and the results are used as parameters to derive the degradation degrees of the inverter pumps 61-65, and thereby it is possible to derive the degradation degree of each of the inverter pumps 61-65 more in line with actual operation.

(4-3)

The inventor recognizes that each of the cumulative operation time, the number of start/stop cycle, and the rotation speed distribution (the cumulative operation times in the low-speed and high-speed rotation regions and total cumulative operation time) of an inverter pump has non-uniform effect on the inverter pump.

Therefore, in the present embodiment, weighting values respectively corresponding to the cumulative operation time, the number of start/stop cycles, and the cumulative operation time and the total cumulative operation time in the low-speed and high-speed rotation regions of the inverter pumps 61-65 are stored in the weighting value storage region 115d of the storage unit 115. Specifically, the above weighting values are derived in advance by simulation or another means, and the derived weighting values are inputted into the air-conditioning system controller 110 through the input unit 113.

Thus, in the present embodiment, weighting values respectively corresponding to the parameters (the cumulative operation time, the number of start/stop cycle, and the cumulative operation times in the low-speed and high-speed rotation regions and the total cumulative operation time) is set, whereby it is possible to derive the degradation degree of each of the inverter pumps 61-65 more in line with actual operation. The weighting values may be changed to suitable values as appropriate in light of the operation statuses of the inverter pumps 61-65. In such a case, the control unit 116 of the air-conditioning system controller 110 also functions as an updating unit to update the weighting value by learning.

(5) Modification Examples

An embodiment of the present invention is described above with reference to the drawings. However, the specific configuration of the present invention is not limited to that described in the above embodiment, and can be changed without departing from the scope of the invention.

(5-1) Modification Example A

In the above embodiment, the cumulative operation time, the number of start/stop cycle, and the rotation speed distribution during operation (including the cumulative operation times in the low-speed and high-speed rotation regions and the total cumulative operation time obtained therefrom) of each of the inverter pumps 61-65 are referenced as parameters to derive the degradation degree of each of the inverter pumps 61-65, but such an arrangement is not provided by way of limitation. The cumulative operation time and the rotation speed distribution during operation (including the cumulative operation times in the low-speed and high-speed rotation regions and the total cumulative operation time obtained therefrom) of each of the inverter pumps 61-65 may be referenced.

In such a case, although the arrangement is somewhat inferior to the above embodiment in terms of deriving the degradation degrees of the inverter pumps in line with actual operation, it is possible to derive the degradation degree of each of the inverter pumps 61-65 more in line with the operation status of the inverter pumps 61-65 than in the past since the rotation speed distribution, which readily affects the inverter pumps, is referenced as a parameter.

In particular, reference of the cumulative operation times and the total cumulative operation time in the low-speed and high-speed rotation regions obtained from the rotation speed distribution during operation makes it possible to derive the degradation degrees of each of the inverter pumps 61-65 more in line with the actual operation status of each of the inverter pumps 61-65 as described above.

(5-2) Modification Example B

Configurations of the air-conditioning system controller 110 other than that in the present embodiment are possible.

For example, the degradation degree derivation unit of the air-conditioning system controller (performing the same basic action as the degradation degree derivation unit 116c in the above embodiment) may derive the increased amount of the degradation degree of each of the inverter pumps in a predetermined period when deriving the degradation degree of each of the inverter pumps. The predetermined period corresponds to a period between installation (replacement) and next replacement of an inverter pump, and is, for example, 2 years.

The determining unit of the air-conditioning system controller (performing the same basic action as the determining unit 116d in the above embodiment) may determine the inverter pumps to be next operated/stopped on the basis of the increased amount of the degradation degree of each of the inverter pumps in the predetermined period.

This specific example will now be described with reference to FIG. 10. In the present modification example, the number of the inverter pumps is considered to be six for convenience of explanation.

For example, it is assumed that a given building has first through sixth inverter pumps having a service life of two years, and a half of the inverter pumps (i.e., three inverter pumps) are replaced at a time every year. FIG. 10 is a table showing the degradation degrees of the respective inverter pumps immediately after new inverter pumps (fourth through sixth inverter pumps) are replaced in this building. In other words, the fourth through sixth inverter pumps are scheduled to be replaced two years later, and the first through third inverter pumps was replaced one year ago and are scheduled to be replaced one year later.

In a building according to this example, if a control in the same manner as that in the above embodiment is performed, it is thought that only the fourth through sixth inverter pumps, which are newly replaced and have a smaller degradation degree, are operated.

Accordingly, in the air-conditioning system controller according to the present modification example, the degradation degree derivation unit derives the increased amount of the degradation degree of each of the inverter pumps in a predetermined period. Specifically, the degradation degree derivation unit uses the degradation degree of each of the inverter pumps at the point when the fourth through sixth inverter pumps are replaced as a reference, and derives an increased amount from this point. The derivation of the increased amounts using the degradation degree of each of the inverter pumps at the point when the fourth through sixth inverter pumps are replaced as the reference is continued until the first through third inverter pumps are replaced. Therefore, when the first through third inverter pumps are replaced, the degradation degree derivation unit uses the degradation degree of each of the inverter pumps at the point when the first through third inverter pumps are replaced as a reference, and derives an increased amount from this point. In the air-conditioning system controller according to the present modification example, the determining unit determines the inverter pumps to be next operated/stopped on the basis of the increased amounts.

Thus, in the present modification example, it is possible to avoid a situation in which only the newly replaced inverter pumps are operated. Accordingly, it is possible to maintain equalization of the degradation degrees of a plurality of inverter pumps.

(5-3) Modification Example C

In the above embodiment, it is described that the air-conditioning system controller 110 controls the first through eighth refrigerators 51-58 and the first through ninth air conditioners 21-29. However, these devices may be controlled by separate control devices. For example, a configuration is possible in which the first through eighth refrigerators 51-58 and the first through fifth inverter pumps 61-65 are controlled by the above air-conditioning system controller 110 and the first through ninth air conditioners 21-29 are controlled by another air-conditioner controller (not shown).

(5-4) Modification Example D

For example, in a case in which it is thought that the effect on the degradation degree of the inverter pump is greater during operation in the low-speed rotation region than during operation in the high-speed rotation region, a reference value and a weighting value may be set in advance to each of the cumulative operation time in the low-speed rotation region and the cumulative operation time in the high-speed rotation region.

INDUSTRIAL APPLICABILITY

The present invention can be applied in a variety of configurations to a control device to control inverter-driven inverter pumps disposed between an air-conditioner and a refrigerator as a heat source device.

What is claimed is:

1. A control device configured to control a plurality of pumps disposed between a heat source device and an air-conditioner, the pumps being inverter-driven, the control device comprising:
   a perceiving unit perceiving a cumulative operation time of each of the pumps and a rotation speed distribution during operation of each of the pumps;
   a degradation degree derivation unit deriving a degradation degree of each of the pumps based on the cumulative operation time of each of the pumps and the rotation speed distribution during operation of each of the pumps;
   a determining unit determining the pump to be next operated/stopped based on the degradation degree of each of the pumps; and
   a storage unit storing weighting values respectively corresponding to the cumulative operation time of the pumps, the operation time of the pumps in a low-speed rotation region and the operation time of the pumps in a high-speed rotation region, and a number of start/stop cycles of the pumps,
   the degradation degree derivation unit further deriving an increased amount of the degradation degree of each of the pumps from a point when the pump is replaced,
   the determining unit determining the pump to be next operated/stopped based on the increased amount of the degradation degree of each of the pumps from the point, and
   the degradation degree derivation unit deriving the degradation degree of each of the pumps further based on the weighting values respectively corresponding to the cumulative operation time of the pumps, the operation time of the pumps in the low-speed rotation region and the operation time of the pumps in the high-speed rotation region, and the number of start/stop cycles of the pumps.

2. The control device according to claim 1, further comprising
   a calculation unit calculating an operation time of each of the pumps in the low-speed rotation region and an operation time of each of the pumps in the high-speed rotation region based on the rotation speed distribution during operation of each of the pumps,
   the degradation degree derivation unit deriving the degradation degree of each of the pumps based on the cumulative operation time of each of the pumps, the operation time of each of the pumps in the low-speed rotation region and the operation time of each of the pumps in the high-speed rotation region.

3. The control device according to claim 2, wherein the perceiving unit further perceives the number of start/stop cycles of each of the pumps, and the degradation degree derivation unit further derives the degradation degree of each of the pumps further based on the number of start/stop cycles of each of the pumps.

* * * * *